Figure 1:
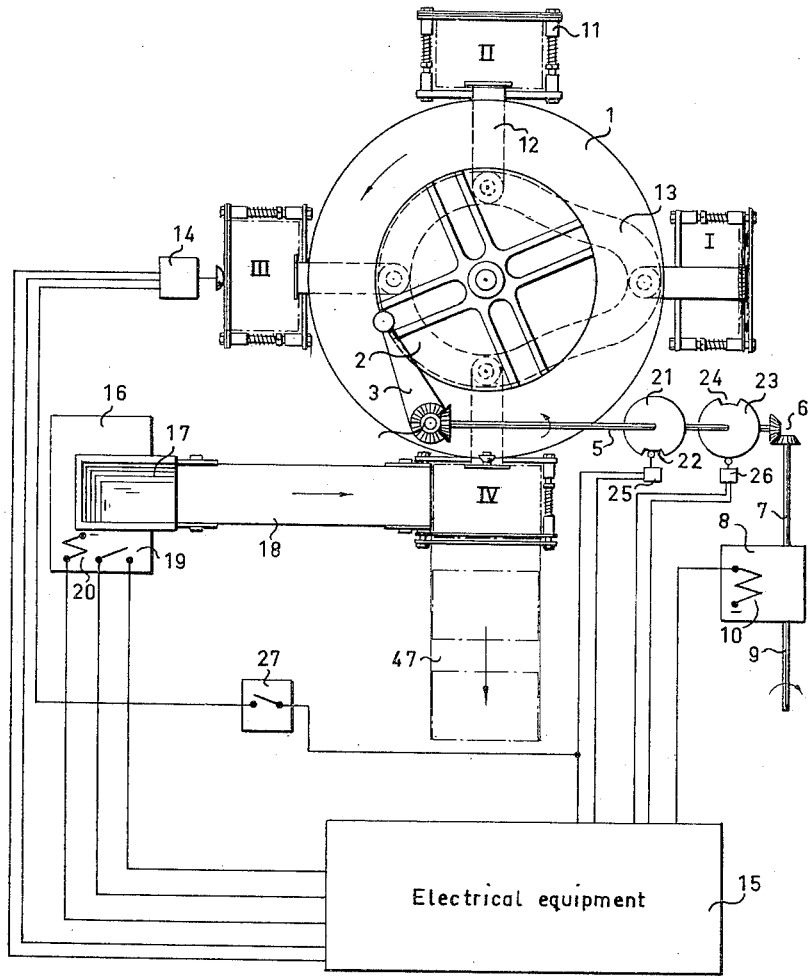

March 13, 1962 S. A. AXLID ETAL 3,024,816
CONTROL DEVICE FOR A PACKING MACHINE ASSOCIATED WITH ONE OR MORE
WEIGHING MACHINES FOR AUTOMATIC WEIGHING OF
PREDETERMINED BATCHES OF MATERIAL
Filed May 25, 1959 2 Sheets-Sheet 1

SVEN A. AXLID AND
HELGE A. ORTMARK
INVENTORS

BY Wenderoth, Lind &d Ponack
ATTORNEYS

United States Patent Office 3,024,816
Patented Mar. 13, 1962

3,024,816
CONTROL DEVICE FOR A PACKING MACHINE ASSOCIATED WITH ONE OR MORE WEIGHING MACHINES FOR AUTOMATIC WEIGHING OF PREDETERMINED BATCHES OF MATERIAL
Sven A. Axlid, Johanneshov, and Helge A. Ortmark, Alsten, Sweden, assignors to Arenco Aktiebolag, Stockholm, Sweden, a Swedish joint-stock company
Filed May 25, 1959, Ser. No. 815,678
Claims priority, application Sweden June 30, 1958
4 Claims. (Cl. 141—83)

The invention relates to a packing machine of the type in which packages are fed step-by-step to a filling station by means of a conveyor and which is associated with one or more weighing machines for automatic weighing of predetermined batches of material.

Automatically operating weighing machines which deliver the weighed batch directly into the package by dumping weighing pans into filling hoppers or by opening weighing hoppers after the predetermined batch has been weighed and a package has been conveyed to the filling station are well known, but are not convenient for packing certain products. The filling hoppers tend to be stopped up if the weighed and delivered material consists of relatively large, sharp-cornered pieces, for example biscuits, which easily become jammed together in the hopper. Attempts have been made, but without any great success, to solve this problem by means of, for example, vibrating hoppers.

In order to avoid the tendency of stopping up the hopper it is necessary to cause the weighed batch to fall down successively into the package. According to the invention this is obtained by using a conveyor belt onto which the batch is delivered and which runs with such a speed that the desired distribution of the material is obtained.

The weighing machine or machines are controlled by a control device which transmits a dumping signal to a weighing machine which has completed its weighing operation, before the package has reached the filling station in order to eliminate the reduction of the packing capacity of the machine which would otherwise result if the resting time of the package at the filling station were to include the time of conveying the weighed batch from the weighing machine to the filling station. Thus, the invention makes it possible to maintain full packing capacity of the machine although weighed batches are not dumped directly from the weighing pan and into the package and further the tendency of the material to stop up the hopper or the mouth of the package, resulting in insufficiently filled packages, has been wholly eliminated.

Accordingly the invention provides a device for a packing machine of the type in which packages are fed step-by-step to a filling station by means of a conveyor and which is associated with one or more weighing machines for automatic weighing of predetermined batches of material, and is substantially characterized by a member rotating together with the driving member of the conveyor and indicating the position of the conveyor, which member at a predetermined angle of rotation operates a sensing device such that an electric circuit of an electromagnetic release member of the material-receiving member, for example a weighing pan or weighing hopper, of a weighing machine is closed so as to cause the material-receiving member of the weighing machine to transfer a weighed batch of material to a conveyor arranged between the material receiving member and the filling station, and in that the interval of time between the operation of the sensing device and the arrival of a package at the filling station is substantially equal to the time of transferring the weighed batch from the weighing machine to the filling station.

The invention further provides control means preventing a batch from being dumped onto the conveyor if a package should not arrive to the filling station in proper time and control means preventing feeding of a package to the filling station if any weighing machine has not weighed the batch required at the time that a signal is normally sent to a weighing machine. It is, thus, positively avoided that batches are wasted and empty or insufficiently filled packages delivered from the packing machine.

Figure 2:
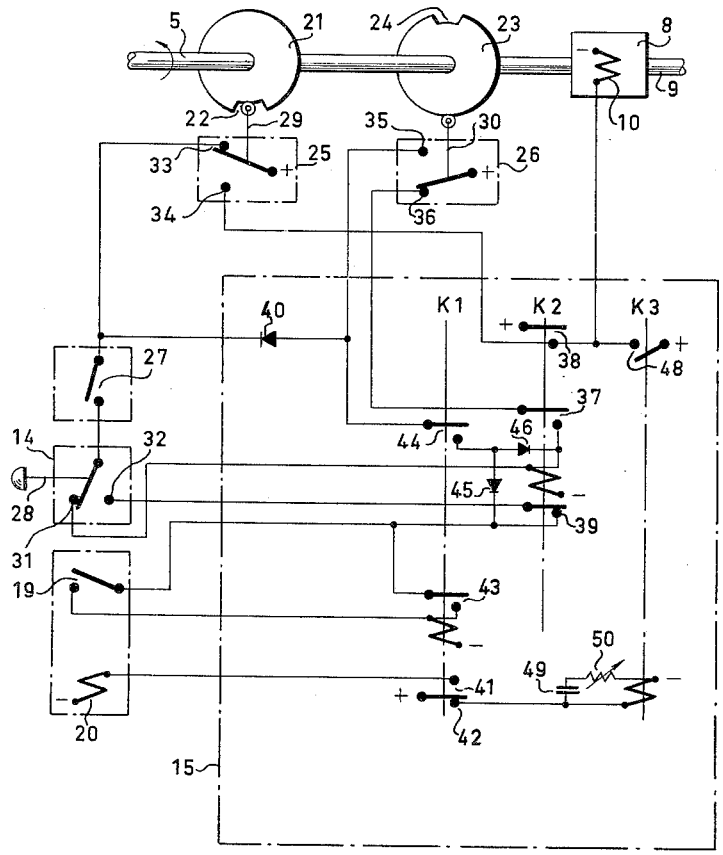

The invention will be described by way of example and with reference to the accompanying drawings, in which FIGURE 1 is a diagrammatical view of a rotating conveyor of a packing machine, in which batches of material, weighed by means of a weighing machine, are transferred to a filling station on the conveyor, and FIGURE 2 shows the electrical equipment controlling the operation of the packing machine and weighing machine.

In FIGURE 1 the rotating conveyor, which is of known type, is denoted by the numeral 1. In the embodiment shown the driving means of the conveyor 1 consists of a Geneva wheel 2 which is operated by means of a rotating arm 3, driven from the main drive shaft 9 through gears 4, a conveyor driving shaft 5, gears 6, a shaft 7, and an electromagnetically operated clutch 8. When the solenoid 10 of the electromagnet of the clutch 8, shown diagrammatically, is energized the shaft 7 is clutched to the main shaft 9 of the machine and the arm 3 will, thus, rotate the Geneva wheel and, accordingly, the conveyor step-by-step counterclockwise, as indicated by an arrow. In the embodiment shown the conveyor will be rotated through 90° for each complete rotation of the arm 3, but it is, of course, possible to obtain other angular movements. The rotating conveyor is provided with gripping means 11, known per se, to hold the packages used. It is assumed in connection with the embodiment shown that the packages consist of bags which are fed to the station I on the rotating conveyor 1, where they are hung up and then opened at their upper ends during the transport to the station II where also the bottoms of the bags will be expanded or "squared." The gripping members of the conveyor are operated by means of slides 12 riding in a closed curved path 13. When the expanded bag has reached the station III it will be sensed by means of a sensing member 14, associated with the control equipment 15, as will be described in more detail hereinafter.

The weighing machine associated with the packing machine is generally indicated at 16 and its material receiving member, shown as a weighing pan at 17. The weighing pan 17 can be dumped so that weighed batches of material are transferred onto a conveyor belt 18, travelling with a predetermined speed and transferring the batches to a filling station IV. The weighing machine, which is of known type, is provided with contacts 19 which will be closed when the desired quantity of material has been fed to the weighing pan and which contacts co-operate with the control equipment 15. An electromagnetic release member, encased in the weighing machine and diagrammatically shown by means of a solenoid 20, controls the weighing pan 17 such that when the circuit through the solenoid 20 is closed from the control equipment 15 the weighing pan is brought into a position in which the weighed batch of material will slip down upon the conveyor belt 18.

A first control member in form of a settable circular cam disc 23 with a notch 24 is secured to the shaft 5 which also carries a second control member in form of a cam disc 21 with a notch 22. These cam discs rotate together with driving means 2, 3 and indicate the angular position of the shaft 5 and, thus, the position of the conveyor 1. Each cam disc 21, 23 cooperates with a sensing means 25 and 26, respectively, which control different operations of the electric control equipment 15, as will be described hereinafter with reference to FIGURES 1 and 2. The latter figure shows the electric control equipment and directly co-operating members. In FIGURE 2 the gearing 6 and the shaft 7 between the clutch 8 and the shaft 5, carrying the cam discs, are omitted as being superfluous for the understanding of the invention.

As shown in FIGURE 2 the three sensing means 14, 25 and 26 shown consist of electric switches with make-and-break contacts, operated by means of sensing arms 28, 29 and 30, respectively.

It will hereinafter be assumed that the main shaft 9 of the machine rotates continuously. The Geneva arm 3 and the cam discs 21 and 23 are positioned as shown when the packing process is initiated by manually closing the contacts 27 of the start switch. A circuit will then be closed to a control relay K2 from positive potential through the contact 33 of the sensing member 25, the contacts 27, the contact 31 of the bag sensing member 14 and the winding of the relay K2 to negative potential. The relay K2 thus attracts and closes a self-holding circuit through the contacts 37 and the sensing contact 36 to positive potential. Simultaneously the circuit of the winding 10 of the clutch magnet is closed from positive potential through the contacts 38 so that the shaft 5 will be clutched to the continuously rotating main shaft 9. The shaft 5 starts to rotate in a direction indicated by an arrow and rotates the cam discs 21 and 23 in the same direction and the Geneva arm 3 counter-clockwise. A bag at the station I will accordingly be fed to the station II. When the cam disc 21 has been rotated through a certain, small angle the sensing arm 29 leaves the notch 22 and follows instead the periphery of the cam disc so that the contact 34 of the sensing member 25 will be connected to positive potential. The control relay K2 remains yet energized in the above mentioned self-holding circuit.

When the shaft 5 has been turned through 90° a bag has been fed from the station I to the station II. During the following rotation through 270° of the shaft 5 the rotating arm 3 will be out of contact with the Geneva wheel and bag conveyor 1 is standing still, but the rotating arm 3 is rotated to the position shown in FIGURE 1 and then a similar operation is repeated so that the bag will be fed to the station III during a rotation through the first 90° of the next 360° rotation of shaft 5. The sensing arm 28 of the bag sensing member 14 will be operated by the expanded bag so that the intermediate contact of the sensing member will contact the contact 32. When the cam disc 23 is adjusted on the shaft 5 as shown the sensing arm 30 will enter into the notch 24 after a further 90°-rotation of the shaft 5, thus opening the self-holding circuit of the control relay K2 through the contacts 36 and 37. The relay will accordingly be deenergized and if the weighing machine has weighed the desired batch of material, indicated by closed contacts 19, a circuit to the electromagnetic dumping control relay K1 will be completed from positive potential through the contact 35, the diode or other uni-directional conducting device 40, the contacts of the main switch 27, the bag sensing contact 32, the contacts 39, the "weighing completed"-contacts 19 and the winding of the dumping control relay to negative potential. The clutch relay 10 is still energized in a circuit from positive potential through the contact 34 and the winding of the relay to negative potential. When the relay K1 attracts, the circuit of the solenoid 20 of the weighing machine will be completed by means of the contact 41, the weighing pan dumped and the weighed batch of material transferred onto the conveyor belt 18 so as to be conveyed to the filling station IV. The relay K1 holds itself from positive potential through the contact 35, the contacts 44, the diode 45, the contacts 43 and its winding to negative potential. Simultaneously a circuit is completed to the control relay K2 from positive potential through the contact 35, the contacts 44, the diode 46 and the winding of the relay to negative potential. As the sensing arm 30 during the continued rotation of the shaft 5 again rides on the periphery of the cam disc 23 the holding circuit of the relay K1 will be broken by contact 35. Prior to this the energizing circuit of the relay K1 has been broken by the contacts 19 when the weighing pan was dumped. When the relay K1 has been deenergized the circuit of the relay 20 will be opened and the weighing pan 17 held in weighing position. During the remaining portion of the revolution of the shaft 5, counted from dumping the weighing pan, i.e. 180°, the batch of material will be fed towards the filling station IV. When the shaft 5 starts rotating a succeeding revolution the first 90° are provided for feeding the bag from station III to station IV and at the moment the bag reaches the station IV or immediately thereafter the batch of material on the conveyor belt 18 reaches the filling station IV and falls down into the bag which is then removed from the packing machine by means of a conveyor belt 47. The time for conveying the batch on the conveyor belt 18 corresponds in the embodiment shown to time of rotating the shaft 5 through the last 180° and the following first 90°. If the length of the conveyor belt is changed, for example shortened, the cam disc 23 must, of course, be correspondingly set.

If the weighing operation is not finished when a bag is positioned at the station III and the sensing arm 30 is positioned in the notch 24 the conveyor 1 will be stopped in the position shown. The "weighing completed"-contacts 19 are not closed and the relay K1, accordingly, not operated. Thus the relay K2 will not operate closing its contacts 38 in series with the winding 10 of the clutch solenoid which will be energized only through the contact 34. When the shaft 5 has completed a revolution and the Geneva arm 3 is in position to drive the conveyor 1 through 90° the sensing arm 29 will be positioned in the notch 22 thereby opening the circuit of the clutch solenoid by means of the contact 34. The shaft 5 will be unclutched and stops rotating. When the weighing of the desired batch of material is completed contacts 19 will be closed so as to complete the circuit of the relay K1 from positive potential through the contact 33, the contacts 27, the contact 32, the contacts 39, the contacts 19 and the winding of the relay to negative potential. The relay K1 then holds itself through the contacts 43. The circuit of the weighing pan relay 20 will be closed from positive potential through the contact 41 and then the weighed batch of material will be transferred onto the continuously running conveyor belt 18. The shaft 5 must not be connected to the main shaft 9 at this point because then it might occur that the batch of material on the conveyor belt would not be put into the bag at the filling station IV, and hence the bag would be transferred to the belt 47 only half-filled or empty.

Connection of the shaft 5 to the main shaft 9 must, accordingly, be delayed for a time corresponding to the rotation of the shaft 5 through the last 180°. This delay time is in the embodiment shown obtained by means of a steady current relay K3 having a release time corresponding to said rotation through 180° of the shaft 5. The relay K3 is normally energized in a circuit from positive potential through the contact 42 which is opened when the relay K1 is energized. If the relay K1 then attracts, as already described, from positive potential through the contact 33 it will be maintained energized by its self-holding circuit until the disc 21 again starts to rotate upon connection of the shaft 5 to the main shaft 9 when the circuit of the clutch solenoid 10 is completed. The circuit of this solenoid 10 will be closed when the relay K3 after the predetermined delay time is deenergized thereby closing its contacts 48. A bag will then be fed to the filling station IV and filled with the batch of material transferred onto the belt 18 and the machine operates normally. Contemporaneously with the feeding of the bag into the filling station IV the circuit of the relay K1 will be broken so that the time control relay K3 again attracts from positive potential at the contact 42. The required delay of the relay K3 is, in the embodiment shown, obtained by means of a condenser 49 serially connected to a variable resistance 50 in parallel with the winding of the relay. The delay time can be adjusted by means of the variable resistance 50.

If a bag should fail or not be expanded at the station III the sensing arm 28 will not be operated and the weighing pan 17 will not be dumped although the "weighing completed"-contacts 19 are closed, because the circuit to the relay K1 will not be completed through the contact 32. Driving of the conveyor 1 continues until the sensing arm 28 is operated by an expanded bag and then a weighed batch of material will be transferred onto the conveyor belt 18, as described.

The invention is obviously not restricted to the embodiment shown having but one weighing machine and a rotating conveyor. Two or more weighing machines may be provided and the electric control equipment 15 accordingly completed such that, for example, the dumping signal is sent to that weighing machine which has completed its weighing operation. The conveyor 1 may obviously consist of a conveyor belt and the control of the packages to control the weighing pan can take place at another station, if required. The cam discs and sensing members shown can be replaced for example by known photo-electric sensing devices.

We claim:

1. A packaging machine having filling means at a filling station and comprising a weighing means, a constant speed material conveyor conveying material to be packaged from said weighing means to said filling station over a period of time, said weighing means having an electromagnetic release means to operate said weighing means to transfer the material being weighed to said material conveyor, a container conveyor for feeding containers step by step to said filling station, rotating driving means driving said container conveyor, a control member rotatable by said driving means and indicating the position of said container conveyor, a sensing means cooperable with said control member and actuated by said control member after rotation thereof through a predetermined angle of rotation, an electric circuit connecting said sensing means with said electromagnetic release means for energizing said electromagnetic release means when said sensing means is actuated, said control member being positioned relative to said driving means for actuating said sensing means at a time preceding the arrival of a container at the filling station, the period of time for the material conveyor to convey material from said weighing means to said filling station and the time for a container to move from a position on said container conveyor when said sensing means is actuated to said filling station being equal.

2. A packaging machine as claimed in claim 1 in which there is provided a container sensing means cooperable with said container conveyor, and contacts in said electric circuit closed by said container sensing means when a container is in said container conveying means.

3. A packaging machine as claimed in claim 1 in which said weighing means comprises a make and break contact which is closed at a predetermined weight on said weighing means, said make and break contact being connected in series with said electromagnetic release means.

4. A packaging machine as claimed in claim 1 and another control member rotated by said driving means and indicating the position of said container conveyor, another sensing means cooperable with said other control member, and an electromagnetic clutch in said rotating driving means, said other sensing means being coupled with said electromagnetic clutch for deenergizing it and disconnecting said driving means when said other sensing means is actuated by said other control member, said other control member being positioned relative to said first mentioned control member for actuating said other sensing means in that position of said driving means in which movement of said container conveyor through one step is to be started.

References Cited in the file of this patent

UNITED STATES PATENTS

| | | |
|---|---|---|
| 1,991,656 | Campbell | Feb. 19, 1935 |
| 2,366,811 | Sebson et al. | Jan. 9, 1945 |
| 2,756,906 | Carter | July 31, 1956 |
| 2,949,714 | Davis | Aug. 23, 1960 |